Figure 1:
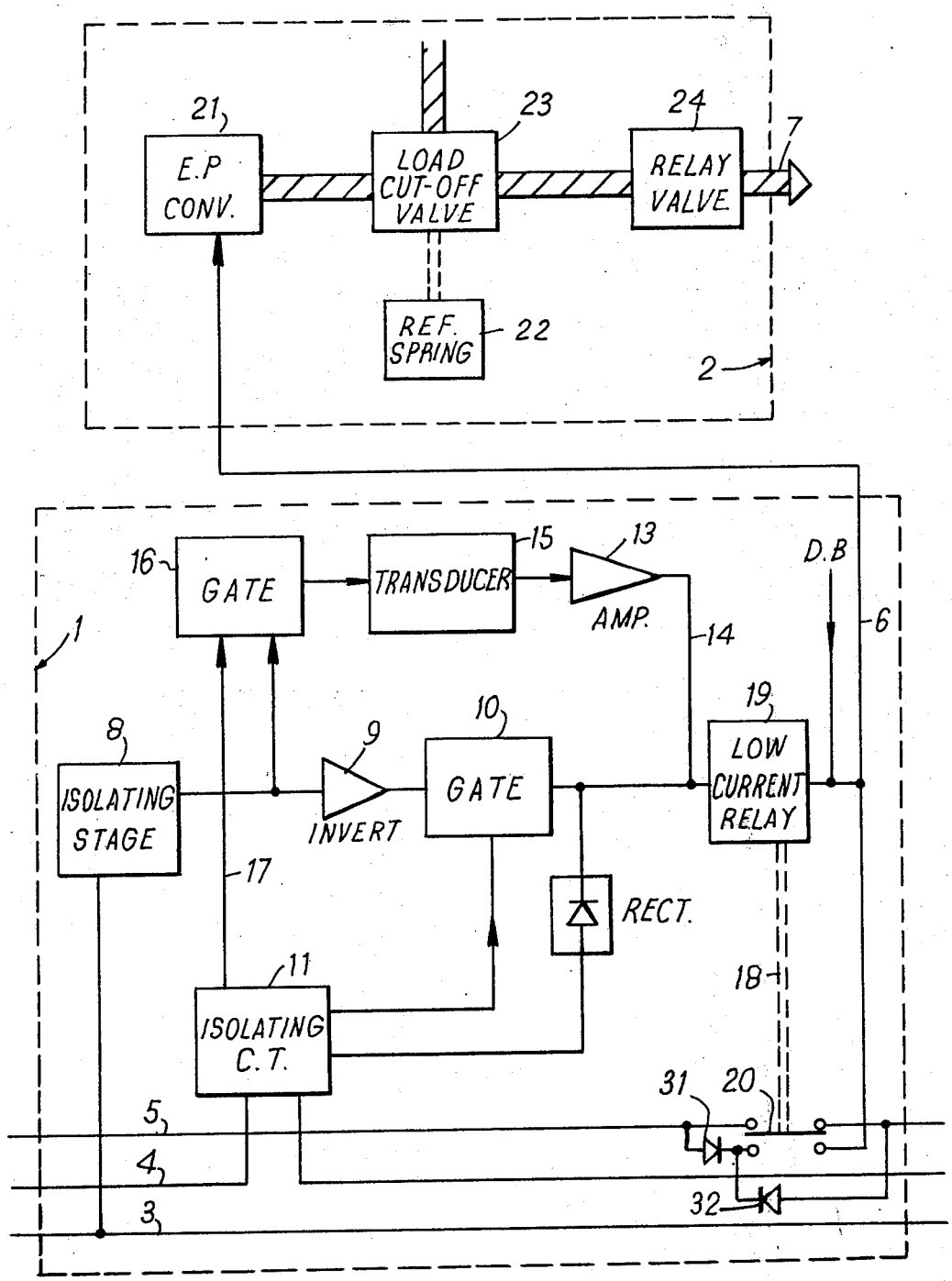

United States Patent [19]
Maskery

[11] 3,970,348
[45] July 20, 1976

[54] ELECTRICAL CONTROL SYSTEM FOR PNEUMATIC BRAKES

[75] Inventor: Arthur Maskery, London, England

[73] Assignee: Westinghouse Brake & Signal Co. Ltd., England

[22] Filed: Feb. 10, 1975

[21] Appl. No.: 548,801

[30] Foreign Application Priority Data
Feb. 14, 1974   United Kingdom.................. 6811/74

[52] U.S. Cl.............................. 303/22 R; 188/195; 303/3; 303/15; 303/20
[51] Int. Cl.² ......................................... B60T 8/20
[58] Field of Search............... 246/182 B; 303/3, 15, 303/20, 22 R; 188/195

[56] References Cited
UNITED STATES PATENTS

| | | | |
|---|---|---|---|
| 3,398,815 | 8/1968 | Brath et al. | 303/22 R X |
| 3,606,484 | 9/1971 | Dressler, Jr. | 303/20 |
| 3,606,490 | 9/1971 | Ando | 303/20 X |
| 3,810,681 | 5/1974 | Matty | 303/20 |

*Primary Examiner*—Stephen G. Kunin
*Attorney, Agent, or Firm*—Larson, Taylor and Hinds

[57] ABSTRACT

A brake control valve apparatus is proposed for the respective cars of a train controlled from one end or the other to be braked by an analogue signal of variable mark-to-space form which operates on each car to gate bursts of train-wire carried a.c. supply which after rectification are used to regulate the brake pressure via an E.P. converter. Additionally in order to enable release of a braked car which fails to release its brake in a tunnel, a train brake release wire is provided which in one example operates in an energized-to-release mode to release a single failed brake or in another example operates in a de-energized to release mode to connect local supplies to operate dump valves on all the brake actuators of the train so providing total release in addition to the normal release by the control valve.

10 Claims, 7 Drawing Figures

3,970,348

ELECTRICAL CONTROL SYSTEM FOR PNEUMATIC BRAKES

This invention relates to brake control apparatus and relates especially to brake control apparatus for operating in response to a control signal current transmitted in a signal conductor communicating to plurality of vehicles of a train of vehicles.

According to the present invention there is provided a brake control apparatus including a control signal input and an a.c. source signal input and gating means responsive to a variable mark-to-space ratio signal when supplied at the control signal input for gating portions of an a.c. signal when supplied at the source terminals and means responsive to the output of the gating means for controlling the brakes.

The source signal may be an emergency braking control signal interruption of which is operable to effect emergency braking.

The apparatus may include also a brake release input responsive to an applied brake release signal for effecting release of the brakes in the event of failure otherwise to release and if desired means may be provided in a system employing the invention for energising the brake release input whenever a brake control device (such as a driver's handle) is placed in a release condition.

The brake release signal may be such as to be sufficient only to release one brake means which fails otherwise to release.

A brake release may be arranged to cause when effected by the brake release signal, the enunciation at a suitable location (such as a driver's position) the existence of a fault presenting failure otherwise to release.

According to a further aspect of the present invention there is provided a brake control apparatus including a brake control signal input and a brake release signal input, electro-pneumatic conversion means responsive to the brake control signal input for adjusting the value of an output fluid pressure for controlling braking and means responsive to a brake release signal for effecting release of the brakes in the event of failure otherwise to release when the brake release signal is provided in operation whenever a brake control device (such as a driver's brake valve) is set to a normal brake release position.

Again, a brake release signal may be such as to be sufficient only to release one brake means which fails otherwise to release.

The invention also provides brake control apparatus including means responsive to an electrical command analogue signal which is variable according to required braking retardation for controlling the magnitude of braking pressure applied to a brake actuator, a command signal conductor via which the command analogue signal is applied to this and other such apparatus, release signal conductor via which a release signal is transmissible to this and other such apparatus, the release signal being effective, when the command signal is such as to call for a release of brake actuator pressure, to control a dump valve to vent brake actuator pressure.

Figure 2:
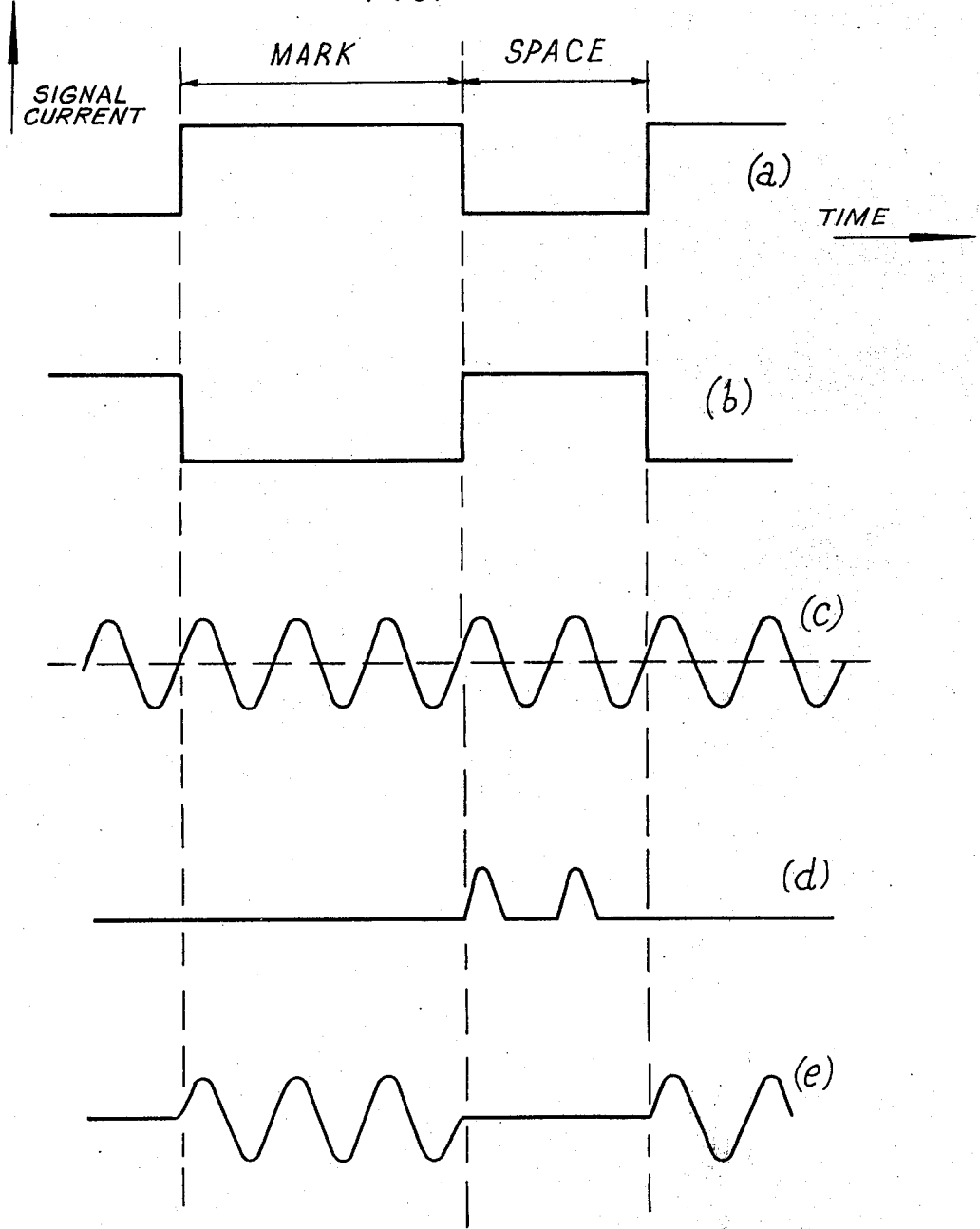
Figure 3:
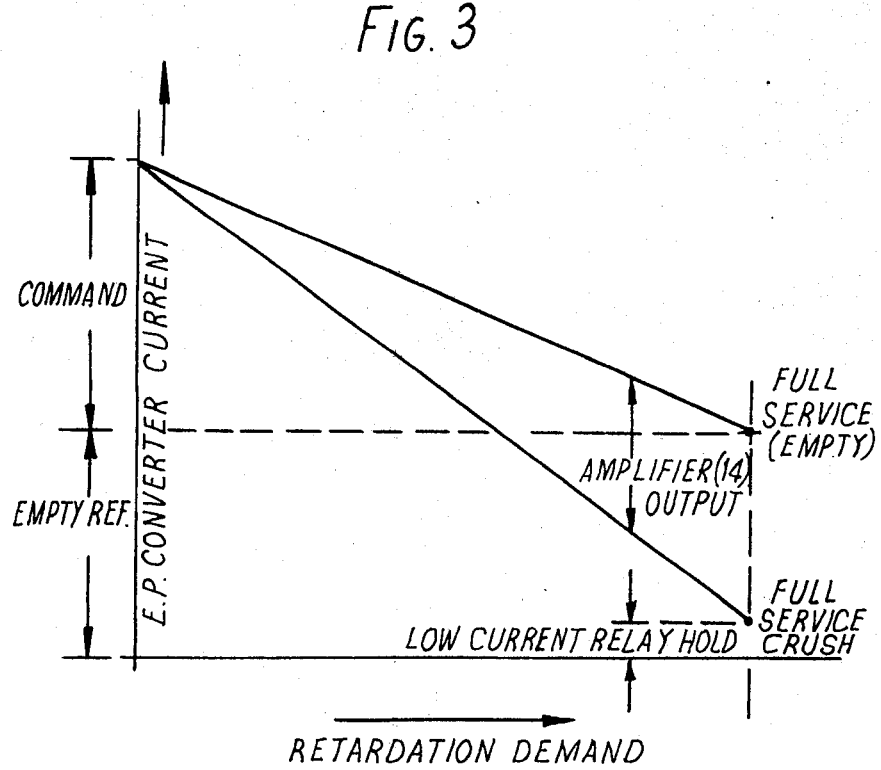
Figure 4:
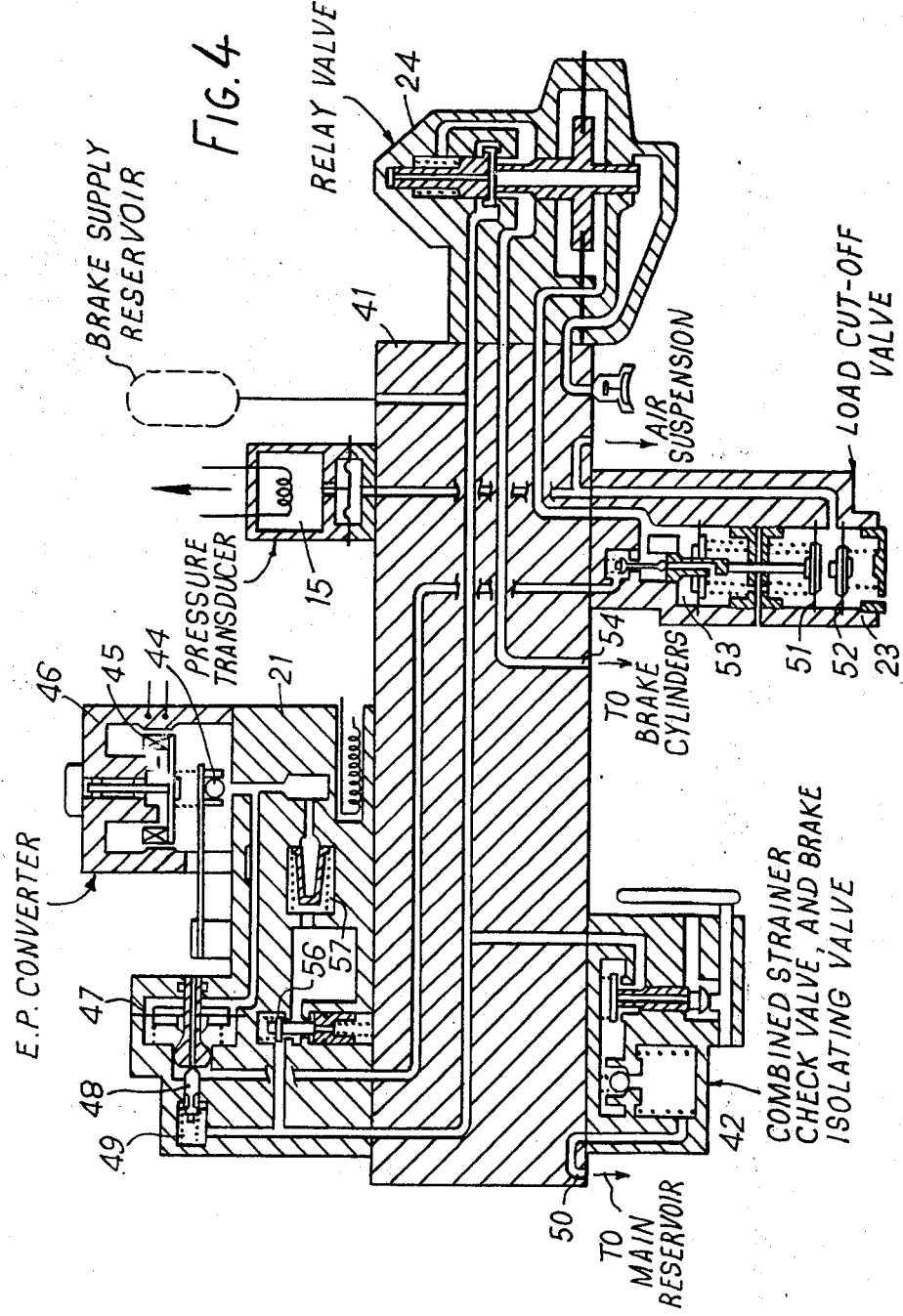
Figure 5:
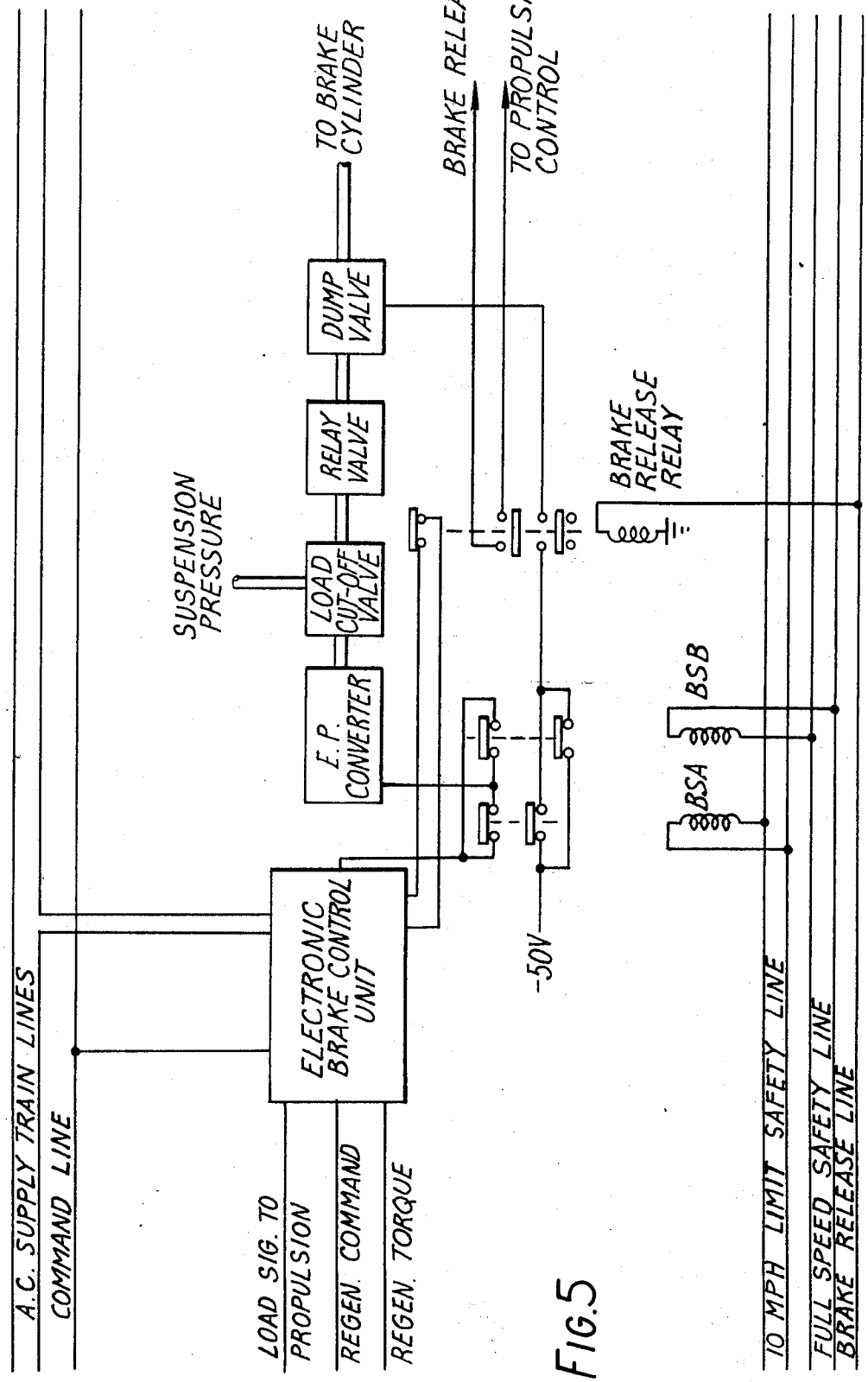
Figure 6:
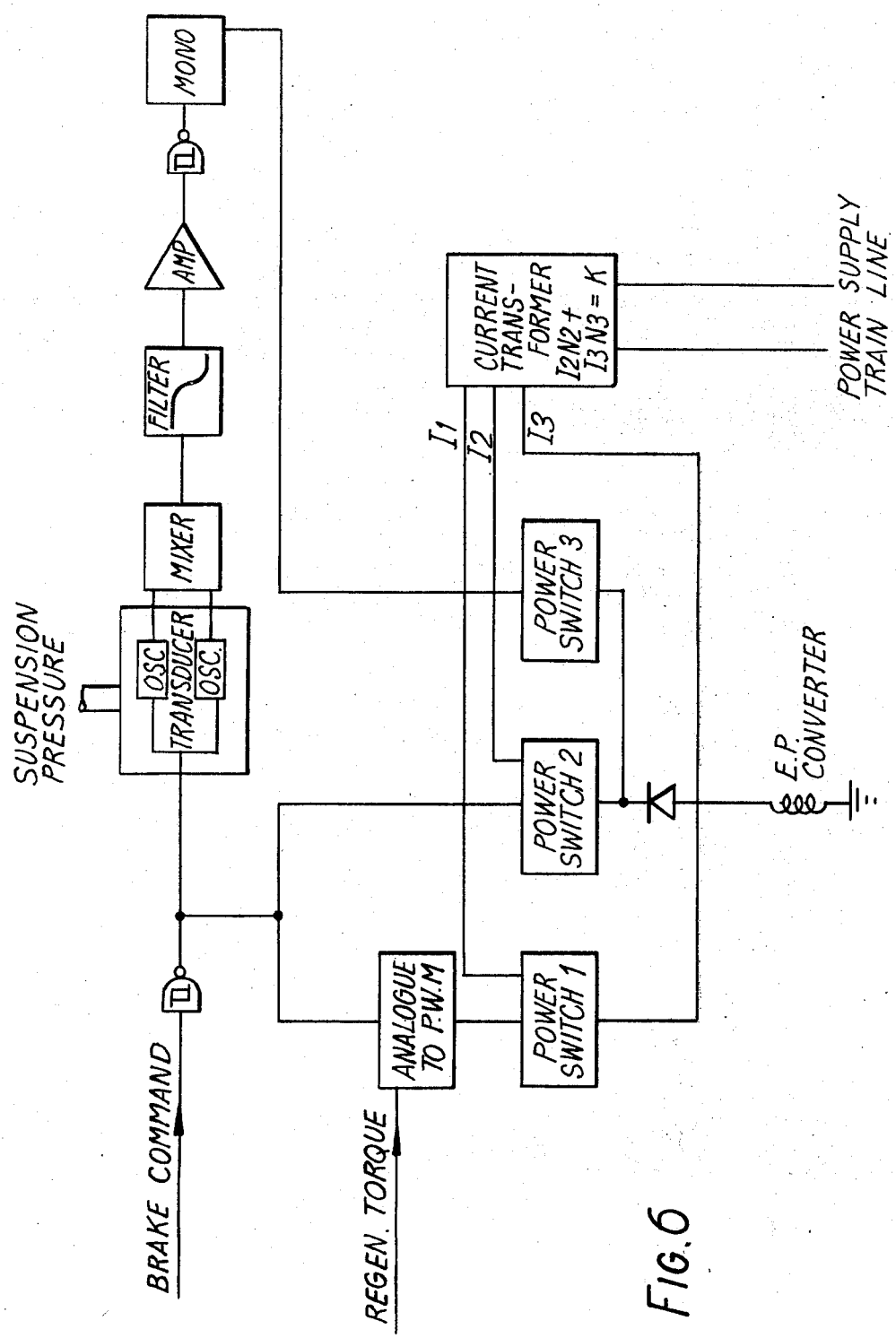
Figure 7:
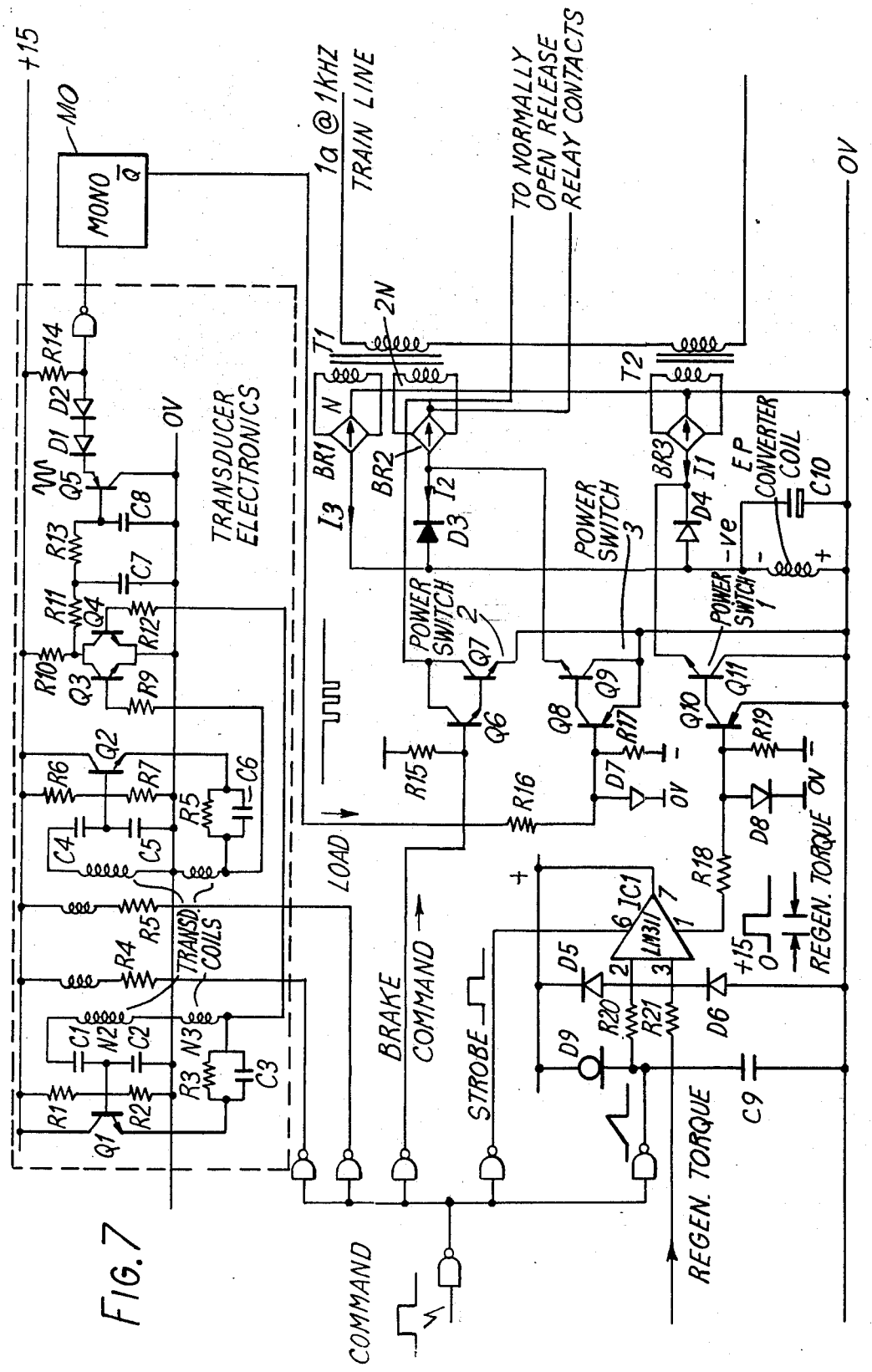

In order that the invention may be more clearly understood and readily carried into effect, the same will be further described by way of example with reference to the accompanying drawings of which:

FIG. 1 illustrates mainly in block schematic form a brake control apparatus employing the invention, FIG. 2 illustrates waveforms reference to which will be made with reference to the operation of FIG. 1, FIG. 3 is a graphical illustration of the signals to be referred to, FIG. 4 illustrates in sectional diagrammatical form an electro-pneumatic brake unit for use with apparatus according to the invention, FIG. 5 illustrates in block form a modification of part of a further modified apparatus according to the invention, FIG. 6, illustrates in block form a signal blending arrangement for use in the control unit of FIG. 5 and FIG. 7, illustrates in greater detail an electronic circuit of the apparatus of FIG. 5 and FIG. 6.

In relation to the descriptions which follow, it will be understood that the apparatus to be described is intended as one of a plurality of such apparatus for controlling respective electro-pneumatic brakes along a train of rail vehicles and the train wires or conductors to which reference will be made are such as to extend from a manual or automatic drivers' location along the train to each successive brake control apparatus. At the same time, it will be observed that the wires and conductors are represented diagrammatically in most instances in the block diagrams to simplify the illustrations. In the case of the a.c. supply wire moreover it may be noted that it may be preferable in certain applications for same to supply each apparatus in succession taken from the rear of the train at the end remote from the drivers' location.

Referring to the drawings, in FIG. 1, the dotted outlines 1 and 2 respectively represent an analogue electronic blending unit and an analogue brake control unit. The analogue electronic blending unit operates to effect broadly the production of an output signal which is dependent upon the weight of a rail vehicle carrying the braking equipment to be controlled, a dynamic brake feedback signal indicative of dynamic braking being produced by dynamic braking means not shown, and a command input control signal indicating the degree of braking (or more strictly the degree of deceleration) required to be effective on the particular car in question. The apparatus is provided with three basic train lines. The train line 3 constitutes a command signal train line and carries the control input to the analogue electronic blending unit 1 together with all other analogue electronic blending units provided on further cars of a train including the overall system. The line 4 is an a.c. supply train line and this is supplied with a constant current a.c. signal, the frequency of which is typically 5KHz and interruption of which is effective, as will be seen hereafter, to immediately cause a brake application in the manner of an emergency brake. Train line 5 cnstitutes a brake release train line which is energisable by a train driver to effect, as will again be seen hereafter, the release of a brake which is controlled by an analogue electronic blending unit which may for any reason fail to produce an output current and therefore cannot of itself effect a brake release in response to the control line. The brake release train line and the command signal train line are provided with a common return wire which is not shown and the emergency train line in effect is the return wire of an emergency supply loop. As shown in the drawing, this emergency train line return wire returns via the analogue electronic blending unit. The output of the electronic blending unit is provided on a line denoted by the reference 6 and this is applied to the analogue brake unit 2 which again, as will be seen hereafter, provides an output fluid pressure in the output connection denoted by the reference 7 for application to the brake cylinders of the braking apparatus controlled thereby.

Referring to the analogue electronic blending until 1 in greater detail, the input signal thereto is derived as afore-mentioned from the command signal train line 3. This input is constituted by a variable mark-to-space ratio d.c. signal which is a.c. coupled via an isolating stage 8 consisting of a resistor and a diode to eliminate spurious signal spikes to an inversion circuit 9. The inversion circuit 9 comprises an emitter follower transistor circuit and Schmitt circuit to produce a clean output waveform, the inverse of the input from 8 and the output of 9 is applied to a power gate circuit of block 10. This gate circuit 10 is a power gate which derives a.c. power from a current transformer through the control primary of which the current in the emergency train line return wire 4 passes. Gate 10 consists of a transistor switch preceded by a rectifier in its a.c. supply. The thus rectified output of the power gate is applied via a "low-current" relay 19 to the output line 6. A further rectified output from the current transformer 11 is applied directly to the output of the power gate circuit 10 via the connection 12 as an "empty car" reference signal level. Also combined with the output of the rectifier is a d.c. output from an amplifier 13 via a line 14. The input to the amplifier 13 is a load weighed a.c. input derived from a load weighing transducer 15 which is supplied from a further power gating circuit 16 and which also is energised from the current transformer 11 and gated by a non-inverted input such as appears at the input to the inversion circuit 9. The transducer 15 is a device of form known in the art which amplifies an electrical signal in dependence upon a pressure signal derived from the rail vehicle suspension. The low current relay 19 operates via a mechanical link denoted by reference 18, relay contacts 20 as shown. These contacts serve to interrupt the supply of brake release train line current to subsequent cars of the train in the event of the relay 19 operating, such as to confine the supply of release current to the analogue brake unit 2 alone. In this way, it is ensured that it is possible by means of energisation of the brake release train line to release brakes on only one car.

Referring to the analogue brake unit included in the dotted outline 2, this consists of an electro-pneumatic converter denoted by the block reference 21, to which the input signal current in the line 6 is applied. This converter produces a fluid pressure output to a load cut-off control valve arrangement which is responsive to a pressure signal derived from the suspension of the vehicle to produce an output to a relay valve 24. This valve relays a corresponding reduction of main reservoir pressure to the fluid pressure output 7 for connecting to the brake cylinders. The valve 23 is provided with a "crush" loaded car reference spring denoted by 22 and the arrangement is adjusted to act as a load cut-off valve to limit the magnitude in braking pressure which can be applied via the relay valve 24 even in the event of an emergency application.

Referring now to the waveforms of FIG. 2, the current which is applied to the command signal train line 3 is represented by the waveform a and this signal is a signal which operates in the manner of an "energised-to-apply" signal for the brakes. An increase in the mark-to-space ratio is thus effective to command an increase in level of braking overall. Since this signal is in normal operation applied to all cars of the train, identical retardation of the respective cars is thereby called for. The signal is applied via the isolating stage 8 to the inverter which therefore means that the signal applied to the power gate 10 is effectively an "energised-to-release" command signal and the apparatus which follows the power gate 10 operates in an "energised-to-release" made. Since the signal in the line 17 is an uninverted signal, this gate a.c. power from the isolating current transformer 11 through the load weighing transducer 15 to the amplifier 13 which produces a chopped d.c. current in the line 14 the magnitude of which increases with the loading of the vehicle. The sense of this current like the empty load reference derived from 11 and mentioned above, is thus in opposition to the current derived from the power gate 10 and fall of which tends to increase the braking force. Accordingly, for increasing load as sensed in accordance with the suspension pressure applied to the load weighing transducer 15, the current applied to the electro-pneumatic converter 21 reduces to have the effect of increasing the braking forces. Conversely, when a d.c. dynamic brake feedback signal in the line D.B. and which is derived from the above mentioned dynamic braking means increases in value indicating an increase of dynamic braking, the current in the line 6 is correspondingly supplemented, with the effect of reducing the braking called for by the E.P. converter 21. The energised-to-release signal which is derived from the power gate 10, is shown in the waveform b of FIG. 2 and the constant current emergency train line supply is denoted by the waveform c. It is to be emphasized moreover that in this example the emergency train line signal, which is as shown in waveform (c) of FIG. 2, is utilised to power the current transformer 11 and subsequently the gates 10 and 16 and also to provide an a.c. empty car reference current signal on the line 12. There is therefore a failure of output current level from the analogue electronic blending unit in the event of the emergency train line becoming broken or de-energised. A typical energised-to-release mark-to-space ratio signal as derived from the power gate 10 is represented by the waveform d in FIG. 2 and the energisation of the transducer 15 from the univerted output from the power gate 16 is represented by the waveform e of FIG. 2.

Referring to FIG. 3, the graphical illustration of the signals which are presented in combination via the low current relay 11 to the E.P. converter via the line 6, shows the resultant current signal for the full range of command signals on the command signal line 3 for empty and crush loaded operation. It will be observed in what manner the energised-to-release command signal and empty load reference signal are counteracted to a certain extent by the non-inverted output derived from the amplifier 13 which is zero for an empty car and has effective magnitude almost equal to the empty car reference signal for a full service application under crush loaded conditions. FIG. 3 assumes for convenience that the dynamic braking feedback signal has been already subtracted from the command signal.

Whilst not shown in the drawing, in a system using the apparatus means are provided coupled to the driver's brake handle for energising the brake release train line 5 from the emergency train line 4 via a current transformer. The brake release line is therefore energised with the source a.c. current signal and therefore a constant current is applied to the brake release train line 5. With all the analogue electronic blending units properly operative, the low current relay 11 in each unit is maintained in the position shown by the always existent current flowing to the line 6 but in the event of a failure, resulting say, from a fault in the current transformer 11 preventing the analogue electronic blending unit operating to produce a brake release, the absence of current level in the low current relay 11 causes the relay to adopt a position opposite to that shown and the brake release train line current is therefore applied directly to the line 6 via one of the diodes 31 and 32, depending upon from which direction the brake release train line is fed. The arrangement is such moreover that operation of a low current relay in one analogue electronic blending unit has the effect of isolating subsequent units from the brake release train line current. Therefore the brake release train line current can itself only operate to release brakes on one car.

Again, whilst not shown in FIG. 1, the circuit arrangement which is controlled by the driver's brake handle to apply a current to the brake release train line can be arranged to supply such a current whenever the brake handle is placed in the release position. This is readily achieved by means of a suitable switch and by this means, and the inclusion of a suitable indicator such as an audible or visible warning device, the flow of current derived from the emergency train line and fed via the brake release train line to a converter of one of the analogue brake units can be utilised to enunciate to the driver that the brake release train line is being used to effect release of a brake which is not otherwise releasable by the analogue electronic blending unit. Whilst therefore only one such fault is in existence, the driver is able to operate the train with all brakes released until appropriate measures can be taken to diagnose the fault. This is particularly useful where a fault occurs in a confined tunnel as in an underground railway system.

The principles of emergency braking are well known in the art but it may be observed that in the present arrangement, a break in the emergency train line loop such as may be caused by an interrupted coupling of a complete parting of a train, immediately interrupts the supply of current to the isolating current transformer such as 11 of the analogue electronic blending units throughout the train with the result that the current in the output line 6 which supplies the E.P. converter 21 falls to an emergency braking level and the E.P. converter produces an output pressure which, limited only by the load cut-off valve 23, is applied to the relay valve 24 to call for an emergency level of braking to be applied to the brake cylinders.

Referring now to the operation of the analogue electro-pneumatic brake unit as represented by the dotted outline 2, this is illustrated in slightly more detail in the drawing of FIG. 4. This drawing shows the analogue E.P. brake unit and it will be seen that mounted on the brake unit there is provided a pressure transducer which is in fact the pressure transducer 15 which is already mentioned in connection with FIG. 1 described above. The unit as a whole comprises a central manifold portion denoted by reference 41 to which there are mounted in addition to the pressure transducer 15, the E.P. converter 21 strainer and check valve 42 with a built-in isolating valve, which is manually operable to isolate the unit from the main reservoir at 50 and vent the unit. The load cut-off valve 23 which corresponds to the valve 23 of FIG. 1 is also shown together with the relay valve 24 also referred to above. The E.P. converter consists essentially of a spring mounted valve member comprising a ball 44, the thrust upon which towards the valve seat, is adjustable by means of the current applied to a coil 45 of an armature mounted in the field of a magnetic yoke 46. Such a converter is described in the Specification of Pat. No. 3799498 and in the case of the converter 21, this has a small associated relay valve having a pressure responsive member 47 for operating a valve member 48 against the thrust of a bias spring 49. The relay valve is supplied via the combined strainer and check valve 42 from a main reservoir which is normally connected to the port 50. The relay valve thus relays pressure from a brake supply reservoir, shown dotted, and charged from the combined strainer and check valve to the load cut-off valve 23 which, as mentioned above, is such as to operate normally only for emergency applications and the pressure which it permits to pass to the relay valve 24 is dependent upon the input fluid pressure applied from an air suspension between pressure responsive members 51 and 52, the cut-off valve itself being operated by the pressure responsive member 51, which is balanced in the lap position by the output pressure applied above a further pressure responsive member 53. The pressure responsive member 52 is such as to normally be in the position shown when air suspension pressure exists but to be urged upwardly by the thrust of a bias spring to urge the load cut-off valve into a condition in which it enables crush loaded emergency braking supply to be applied to the relay valve 24 in the event of the air suspension pressure disappearing. The relay valve 24 is of conventional form and supplies pressure from the brake supply reservoir to the brake cylinders which are connected to an output port 54, this pressure being dependent upon the pressure which is derived from the E.P. converter 21 via the load cut-off valve.

Not hitherto mentioned is a pressure limiting valve denoted by the reference 56 and a filter denoted by reference 57, for supplying air pressure to the E.P. converter. However, these, along with the operation of the E.P. converter, will be more fully understood having reference to the above-numbered co-pending Patent.

In the apparatus described in the foregoing, it will be understood that a failure to achieve a brake release in the normal way in response to the variable mark-to-space signal on the control train line, gives way to the utilisation on the faulty car of the release signal on the release train line and enunciation thereof. This enables the safe operation of the train when the fault occurs say in a tunnel and embarrassing delays and difficulties, otherwise encountered in achieving manual release of the brake itself after finding which one has failed, are avoided.

In an alternative form of an embodiment of the invention, the operation may be different to the extent that energisation of the release wire is effective every time the command is such as to call for release of the brakes and energisation of the release line is effective to operate magnet valves powered from local supplies on each car. The magnet valves then respond and vent the respective brake cylinders on every car. In this way a release of the applied brakes is positively ensured independently of the brake control valves and the control circuits thereto. Accordingly the likelihood of embarrassment due to a failure to release a brake in a tunnel is appreciably reduced and made possible only in the event of a failure also of a magnet valve or the release line circuit which controls it.

The system is further rendered safe by the use of "safety train lines" which operate relays on each vehicle. De-energisation of the safety lines cut all local power and produces an emergency brake application. Thus an objection which is based upon the stipulation that it shall not be possible to operate a train with a failed brake is overcome by the thus interlocked safety equipment. Two sets of safety wires are provided which are typically referred to as full speed safety wires and the 10 m.p.h. safety wire. Provided that one set of wires is energised the brakes are enabled to be released. These wires are energised by a train Safety Box which forms part of the signalling equipment. Above 10 m.p.h. the 10 m.p.h. line is de-energised resulting in emergency braking. This provides a driver with the facility of moving a faulty train at speeds below 10 m.p.h.

Referring now to FIG. 5 this illustrates in block form a modified arrangement of part of the apparatus of FIG. 1 in which the various blocks are appropriately labelled. The brake release is shown in the energised state (braking). During motoring the brakes are held in release by energising the dump magnet valve from a local supply via the brake release relay and the safety relays. A set of normally closed contacts are used to indicate to the propulsion equipment that brakes are released. A set of normally open contacts prevent the electronic unit from driving the E.P. converter into application during motoring. This would not cause an application because of the overriding dump magnet valve. However, pressure would be trapped at the inlet side of the dump valve, which may produce a momentary non jerk-limited application when changing from motoring to braking. When making an emergency application relays B.S.A. and B.S.B. are de-energised, cutting power to the E.P. converter. The converter output thus goes high (crush load) but the final brake cylinder pressure is limited to the correct pressure by the load cut-off valve.

In addition to the safety wires, the release power supply train wire and the brake command wire, the block representing the electronic brake control unit is shown having an output for regeneration brake command and load signals to the propulsion equipment neither of which constitute any part of the invention but the former regenerative torque input signal provides a regenerative torque signal corresponding to the D.P. signal of FIG. 1.

A block diagram of the basic electronic control unit for performing the blending of the electro-pneumatic brake and the regenerative dynamic brake is shown in FIG. 6. This again does not include elements which would also normally be provided to provide a command signal to the regenerative brake.

As will be appreciated from the foregoing, the apparatus is required to provide an operating characteristic is referred to with reference to FIG. 3 and the circuit associated with the current transformer of FIG. 6 and the blocks representing power switches is more fully illustrated in FIG. 7. As will be seen, the said power switches are provided by respective transistor pairs Q10, Q11; Q6, Q7 and Q8, Q9. The transition from release to empty car braking is effected by consecutive switching of currents I2 and I3. Currents I2 and I3 are derived from separate windings on the same current transformer. Thus I2 N2 + I3 N3 is a constant N2 and N3 being the number turns of the transducer coils, as indicated. Assume for simplicity that the command signal is modulated from zero to 100% duty cycle. At full release (zero duty cycle) switch 2 is off. The converter is held in release by I3. At full application power switch 2 (transistor Q6, Q7 of FIG. 7) is turned on. The current I2 flows into the converter and develops a finite voltage across it. Since I3 is greater than I2 and N3 has less turns than N2. Therefore the voltage across N3 is lower than the voltage across N2. Thus when SW2 is on, current I3 is automatically turned off without using a switch, by virtue of the rectifiers required to produce D.C. currents.

By design I2 is the current required to give empty car braking. Thus as the command signal is modulated from its lowest to highest duty ratio there is a linear change of current from release to empty car level. In a detailed design modulation is 5% to 95% and I2 and I3 will be appropriate to this modulation.

The load control circuit is only responsible for the increase in weight from empty to crush load. Multiplication is the product of duty cycle and frequency. The pressure transducer is designed to produce a frequency proportional to passenger load being zero for an empty car and high for crush load. The final transducer output is in the form of constant area pulses taken from a retriggerable monostable circuit. The pulse width modulated command signal gates the transducer on and off. Thus the product is in the form of bursts of constant area pulses. The total number of pulses in the period of the command signal is proportional to its duty cycle and the passenger load. For ease of design the monostable output pulse width can be made equal to the period of the highest frequency. Thus at crush load the output of the monstable circuit is a reproduction of the command pulse width modulated signal. The output from the load multiplier drives power switch 3, which shunts the output from power switch 2. Thus for a crush loaded car I2 does not reach the E.P. brake valve. The valve current is therefore proportional to:- (100% -Command Duty Cycle %) I3/100% which produces a crush load characteristic such as shown in FIG. 3. For intermediate loads the command signal duty cycle is effectively modified by load, thus producing a family of curves.

The transducer utilises a commercially available variable reluctance transducer which has two variable reluctance halves which vary in a complementary manner. The two halves are arranged as Hartley oscillators described in more detail below. The outputs of the oscillators are mixed in a mixer formed by transistors Q3, Q4 of FIG. 7 to produce a beat note or frequency proportional to load. The mixer output is filtered and squared before driving a monostable circuit as shown to give constant area pulses. At empty car pressure the transducer is adjusted to give a zero beat. At crush load the monostable circuit is adjusted to give maximum duty cycle. The oscillators are "gated" by switching current through spare windings on the transducer. A system in which the oscillators are gated is chosen in preference to continuous oscillation followed by a gate because the final output is to be synchronised with the pulse width modulated command signal thus preventing the generation of very low frequency beat notes at or close to empty car loading. The release and empty car valve currents I3 and I2 referred to are provided by transformer T1 via rectifiers BR1, and BR2 respectively. I2 is modulated by the command signal via the brake release relay contacts and power switch 2. During motoring the relay contacts are open and the E.P. converter remains "in release." The command signal enters the unit via spike suppression circuits and drives a Schmitt trigger as before to provide a clean switching signal as shown as COMMAND in FIG. 7. The Schmitt trigger output drives power switch 2 and other discrete components via open collector logic elements. The logic elements are inverters or "NOR" gates as shown. An additional inverter is required after the input Schmitt trigger to drive successive inverters in the correct phase.

Referring now in greater detail to the transducer electronics, transistors Q1 and Q2 form the said Hartley oscillators in conjunction with the "cap" and "pressure" end windings of the transducer. The oscillators are gated off by shunting windings N1 with low impedance loads, vig., resistors R4 and R5, via open collector inverters 1 and 2. The oscillators are gated ON by switching inverters 1 and 2 OFF. The rapid turn off causes the two tuned circuits to ring, promoting virtually instantaneous oscillations. Outputs from windings N3 drive the mixer formed by Q3 and Q4. The low frequency beat note taken from the collectors has a peak-to-peak amplitude of half the supply voltage. The frequencies f1, f2, and f1 + f2 are removed by the two section RC filters formed by elements R11, C7 and R13, C8, respectively. Emitter follower Q5 and diodes D1, D2 raise the mean D.C. level to approximately 5.5V in order to drive H.N.I.L. inverter 6 which squares the waveform and provides an interface with the retriggerable monostable circit M0. The Q output from the monostable circuit M0 is normally high, holding Q8 and Q9 OFF. Negative-going constant area pulses turn Q8 and Q9 ON, shunting current I2 to ground.

The regenerative torque signal is in the form of a low level D.C. analogue signal. It is converted to pulse width modulaton by comparing it with a linear ramp. During the command signal OFF period at the end of each input cycle, capacitor C9 is discharged by inverter 5. The integrated circit comparator IC1 is strobed OFF by inverter "strobe" input shown, Q10 and Q11 are turned ON, shunting I1. During the command signal ON period, the circuit IC1 is turned ON by the positive torque signal. Capacitor C9 charges via constant current diode D9. The output of IC1 drives the base of transistor Q10 positive, turning transistors Q10 and Q11 off. I1 is fed into the E.P. converter via diode D4. After a period proportional to torque, the voltage on capacitor C9 is equal to the torque voltage and comparator IC1 is turned OFF. Transistor Q11 of power switch 1 is turned ON.

Although it forms no part of the invention, a D.C. traction control signal can be extracted by combining the basic command P.W.M. signal (Empty Car Brake) and the load signal. The load and empty car signals may be fed into open collector inverters. The positive going pulses at the inverter outputs are then added and integrated to give a smooth D.C. analogue. The integrator output will then be negative and second inverter may convert it to a positive going analogue.

Having thus described my invention what I claim is:

1. Brake control apparatus for a vehicle braking system which generates a brake control signal for controlling the vehicle brakes, said apparatus comprising a control signal input, an a.c. signal input, gating means responsive to a variable mark to space ratio signal when applied at the control signal input for gating portions of an a.c. signal when such an a.c. signal is supplied at the said a.c. input and means responsive to the output of the gating means for controlling the magnitude of the brake control signal in dependence upon said mark to space ratio.

2. Brake control apparatus as claimed in claim 1, being part of a system in which there are a plurality of such apparatus, each such apparatus receiving the same control signal as a variable mark-to-space current signal in a conductor coupling the said plurality of such apparatus in a series arrangement, the a.c. signal input being supplied from a constant current source via a further such conductor.

3. Brake control apparatus as claimed in claim 2, including a further brake release signal conductor coupled to each such apparatus, the energization state of which brake release signal conductor is effective to control the respective brake to a release condition.

4. Brake control apparatus as claimed in claim 2, including a further brake release signal conductor coupled to each apparatus and one state of energisation of which upon failure of one such apparatus to respond to the control signal to release the respective brake, is effective to release the respective brake and inhibit transmission of the energisation of the one state of release signal conductor to any further such apparatus.

5. Brake control apparatus as claimed in claim 3, wherein connected to a brake actuator of each respective braking apparatus there is provided a dump valve which is electrically energised and arranged to be responsive to deenergised state of the release signal conductor to dump brake actuator pressure to effect a release of the brake when so controlled by the release signal conductor.

6. Brake control apparatus as claimed in claim 5, wherein the said dump valves for each such apparatus are each respectively energized from a local supply to open and effect a release in response to de-energization of the release signal conductor.

7. Brake control apparatus as claimed in claim 1 further comprising vehicle load-weighing control means for controlling the braking for the vehicle, said load-weighing means including transducer means, comprising first and second oscillators, for producing a beat frequency proportional to load, said transducer means producing a zero beat frequency under no load conditions and producing progressively higher beat frequencies with increasing vehicle load, means responsive to the output of said transducer means for producing a load-weighing control signal.

8. Brake control apparatus, for use in common with other such apparatus including a dump valve, means responsive to an electrical command analogue signal which is variable according to required braking retardation for controlling the magnitude of braking pressure applied to a brake actuator, a command signal conductor through which the command analogue signal is applied to said apparatus and other such apparatus, a release signal conductor through which a release signal is transmissible to said apparatus and other such apparatus, the release signal being effective when the command signal is such as to call for a release of brake actuator pressure, to control said dump valve to vent brake actuator pressure.

9. Brake control apparatus as claimed in claim 8 including means whereby release of the brake in response to a state of the release signal conductor is conditional upon a predetermined state of energisation of a safety signalling train line.

10. Brake control apparatus for a vehicle braking system which generates a brake control signal for controlling the vehicle brakes, said apparatus including load-weighing control means for controlling the braking of the vehicle in accordance with the loading of the vehicle, said load control means including transducer means for receiving a signal proportional to the vehicle loading and comprising first and second oscillators whose output frequencies vary with load, and means connected to said oscillators for producing a beat frequency signal proportional to load, said beat frequency signal varying from zero under no load conditions to a maximum for full load conditions, and means responsive to the output of said transducer means for generating a load-weighing control signal for controlling the braking of the vehicle.

* * * * *